United States Patent [19]

Senda et al.

[11] Patent Number: 4,734,566

[45] Date of Patent: Mar. 29, 1988

[54] APPARATUS AND METHOD FOR RECOGNIZING OPTICAL INFORMATION

[75] Inventors: Katsumi Senda; Toshiyasu Sakai, both of Kariya, Japan

[73] Assignee: Nippondenso Co., Ltd., Kariya, Japan

[21] Appl. No.: 828,742

[22] Filed: Feb. 12, 1986

[30] Foreign Application Priority Data

Feb. 19, 1985 [JP]  Japan .................................. 60-31709

[51] Int. Cl.⁴ .............................................. G06K 7/14
[52] U.S. Cl. ..................................... 235/455; 235/454
[58] Field of Search ................................ 235/454, 455

[56] References Cited

U.S. PATENT DOCUMENTS 4,315,245  2/1982  Nakahara ............................. 235/455
4,356,389  10/1982  Quirey ................................. 235/455

Primary Examiner—Harold I. Pitts
Attorney, Agent, or Firm—Cushman, Darby & Cushman

[57] ABSTRACT

Apparatus and method for recognizing optical information such as bar code has a light source and an image sensor which converts intensity of light reflected by the optical information into an electric image signal. The electric image signal is sample-and-held to detect the average intensity of light from the light source. The time interval for activating the light source is pulse width modulated in accordance with the detected average intensity in a previous operational cycle.

14 Claims, 8 Drawing Figures

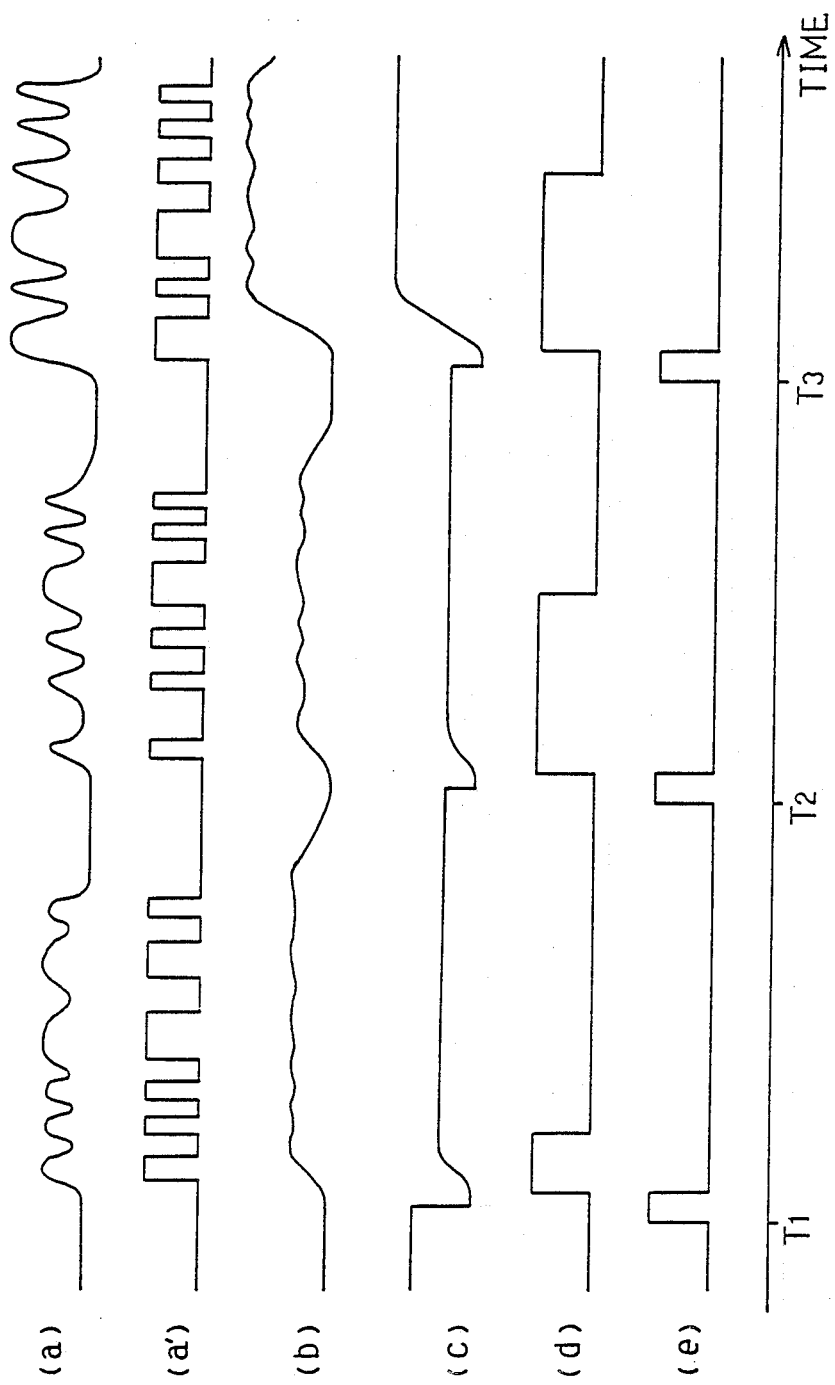

APPARATUS AND METHOD FOR RECOGNIZING OPTICAL INFORMATION

BACKGROUND OF THE INVENTION

The present invention relates to apparatus and method recognizing optical information such as bar codes or characters printed on labels and so on.

In a conventional systems of this kind, laser light from a laser light tube has been projected onto optical information such as bar codes or characters printed on a label and reflected light corresponding to the printed optical information has been converted into electric signals by an optoelectric converter so that the printed optical information may be recognized from the electric signals.

This apparatus, however, is disadvantageous in that frequent maintenance service to the laser light tube must be made. Further, the apparatus is big in size and expensive.

To overcome the above-described disadvantage, it has been suggested by Japanese patent application, laid-open No. 57-166672, to use a flash discharge tube to project flash light onto the printed optical information.

It is, however, difficult to finely adjust the intensity of flash light and hence stability in recognizing the optical printed information is degraded.

SUMMARY OF THE INVENTION

It is therefore a primary object of the present invention to overcome the above-described disadvantages.

It is a further object of the present invention to provide an optical information recognizing apparatus having an improved light source.

It is a still further object of the present invention to pulsate light projected onto optical information.

According to a preferred embodiment of the present invention, an electronically-scanned image sensor using a charge coupled device is used as an optoelectric converter and output image signals from the image sensor are averaged to detect the intensity of light in each of a plurality of operational cycles. The light projected onto the optical information is pulse width modulated in accordance with the detected intensity of light in the previous operational cycle.

BRIEF DESCRIPTION OF THE ACCOMPANYING DRAWINGS

In the accompanying drawings:

FIG. 3, consisting of (a), (a') and (b)–(e), is a waveform chart showing waveforms (a) through (e) produced by the electronic circuits of FIG. 2.

DETAILED DESCRIPTION OF THE PREFERRED EMBODIMENT

Figure 1:
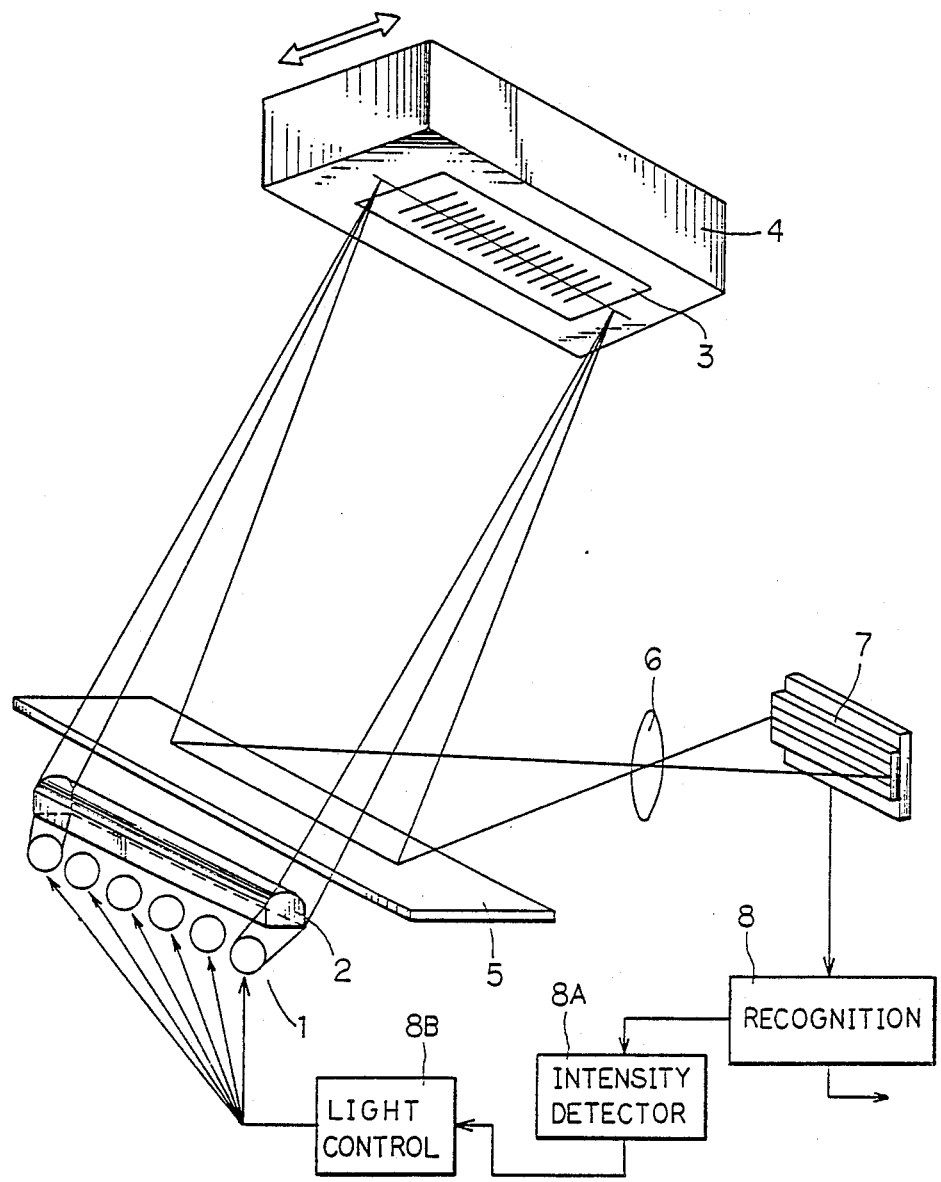
FIG. 1 is a schematic diagram showing an overall arrangement of an embodiment according to the present invention.

The present invention will be described with reference to an embodiment shown in FIG. 1. In this figure, numeral 1 designates a light source comprising a group of red-light emitting diodes for emitting red-light, numeral 2 designates a lens for collecting the red-light emitted from the light source 1 to provide a uniform light. Numeral 3 designates a label attached to an article 4 which is moved over the lens 2. The label 3 is recorded thereon with an optical informatin in the form of bar code which is a combination of black bars and white bars. Numeral 5 designates a planar reflection mirror for reflecting the light reflected by the bar code label 3 and directing the reflected light toward a lens 6 and an image sensor 7. The lens 6 collects the reflected light and provides a bar code image on a predetermined position of the image sensor 7. The image sensor 7 is a conventional chargecoupled device used as an optoelectric converter.

Numeral 8 designates a bar code recognition unit for recognizing bar code information from an output image signal from the image sensor 7, 8A designates a light intensity detecting unit for receiving a signal from the recognition unit 8 and detecting the intensity of light, and 8B designates a light control unit for pulsating the light source 1 in accordance with output detection signal from the light intensity detection unit 8A.

Figure 2:
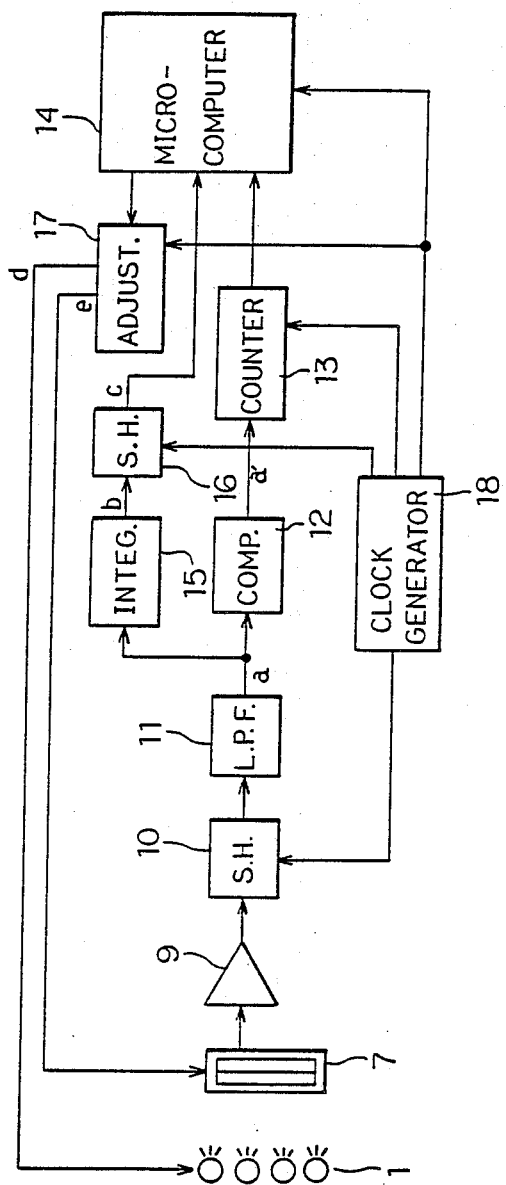
FIG. 2 is an electric wiring diagram showing electronic circuits used in the embodiment shown in FIG. 1.

The detailed circuit configuration of the units 8, 8A and 8B is shown in FIG. 2. Numeral 9 designates an analog amplifier for amplifying the output image signal produced intermittently from the image sensor 7, 10 designates a sample-hold circuit driven by a clock generator 18 for converting the amplified intermittent output signal from the analog amplifier 9 to a continuous signal by periodic sample-and-hold operation, and 11 designates a low pass filter for smoothing the output signal form the sample-hold circuit 10. Numeral 12 designates a comparator circuit for converting the output signal from the low pass filter 11 into a digital signal having high and low output levels corresponding to black bars and white bars of the bar code. Numeral 13 designates a counter for counting clocks from the clock generator 18 during a period in which the digital signal from the comparator circuit 12 is kept high or low. Numeral 14 designates a microcomputer for recognizing the bar code form output count signal from the the counter 13. As will be described later, the microcomputer 14 controls the light source 1 by pulsating.

Numeral 15 designates an integration circuit for integrating the output signal of the low pass filter 11 so that the average magnitude of the output image signal from the image sensor 7 is obtained. Numeral 16 designates a sample-hole circuit driven by the clock generator 18 for sample-and holding an output average signal of the integration circuit 15. Numeral 17 designates a pulse-width adjusting circuit driven by the clock generator 18 for pulsating the light source 1 by adjusting the time interval in which the light source 1 is activated in accordance with an output signal from the microcomputer 14 which calculates the detected light intensity indicated by an output signal from the sample-hold circuit 16. The adjusting circuit 17 further produces a start pulse signal periodically to cause the image sensor 7 to produce the image signals.

Operation of the above-described embodiment will be described next. As the article 4 having the bar code label 3 is moved over the light source 1, the lens 2 and the reflection mirror 5, the light source 1 is activated to project red-light of high intensity onto the bar code label 3. Since the white bar and the black bar on the bar code label 3 have different light reflectivity, the intensity or brightness of the reflected light corresponds to the bar code and the reflected light is received by the image sensor 7 through the reflection mirror 5 and the lens 6. The image sensor 7 converts the reflected light into the corresponding image signal. In more detail, each element of charge coupled device in the image sensor 7 stores respective charges corresponding to the reflected light until the next start pulse is applied thereto, the stored charges are transferred parallel to a register in the image sensor 7 in response to the start pulse and thereafter produced serially in a known manner. The output signal from the image sensor 7 is amplified by the analog amplifier 9 and the output signal of the amplifier 9 is sample-and-held by the sample-hold circuit 10 in response to a sampling pulse produced from the clock generater 18. The output signal of the sample-hold circuit 10 is applied to the low pass filter 11 which eliminates noise signals of high frequency. The output signal of the low pass filter 11 shown in (a) of FIG. 3. The comparator circuit 12 compares this signal with a predetermined level signal to produce the digital signal having a high level and low level corresponding to white bar and black bar of the bar code. This digital signal is shown in (a') of FIG. 3. Each pulse width of the high level and low level of the digital signal is measured by the counter 13 which counts clock pulses from the clock generator 18. The count output of the counter 13 is applied to the microcomputer 14 which recognizes therefrom the information carried by the bar code. The above-described circuit configuration and operation is well known by NOJIRI et al U.S. Pat. No. 4,096,992 assigned to the same assignee of the present invention.

The output signal of the low pass filter 11 is applied to the invention circuit 15 to be averaged therein as shown in (b) of FIG. 3. This averaged signal is sample-and-held as shown in (c) of FIG. 3 until a sampling pulse from the clock generator 18 is applied thereto at the end of the start pulse shown in (e) of FIG. 3. Receiving this signal, the microcomputer 14 calculates the intensity of light from the light source 1 and produces the output signal to the pulse width adjusting circuit 17. The pulse width adjusting circuit 17 responsively shortens or lengthens, as shown in (d) of FIG. 3, the time period in which the light source 1 is activated to emit light.

In FIG. 3 in which time intervals T1 through T2, and T2 through T3, designate each operational period of the image sensor 7, it is assumed that activation of the light source is initiated just after the start pulse and that the activation period of the light source 1 is shortened in the time period T1 through T2. This results in the decrease of the signals (b) and (c) in FIG. 3 in the period T2 through T3. In this case microcomputer 14 detects at time T3 that the intensity of light from the light source 1 is too weak and the pulse width adjusting circuit 17 activates the light source 1 much longer in the period after time T3 than in the time period T1 through T2 so that more intensity light is provided onto the bar code label 3 from the light source 1. It is to be noted that if the output image signal from the image sensor 7 is increased during the time interval T2 through T3 because of lengthened activation period of the light source 1 in the period T1 through T2, the microcomputer 14 detects that the intensity of light from the light source 1 is activated. Thus, the intensity of light emitted from the light source 1 is always detected and the variation thereof is compensated for so that a uniform intensity of light is provided.

The above-described embodiment may be modified in many ways. For instance, the intensity of light from the light source 1 can be detected in accordance with the peak level of the output image signal from the image sensor. A discharge tube such as a xenon lamp can be used as the light source. Further, activation of the light source in each operational period of the image sensor may be made plural times as long as the total activation period of the light source in each operational period of the image sensor is controlled in accordance with the detected intensity of the light.

What is claimed is:

1. A method of reading optical information from an object, comprising the steps of:
   projecting a plurality of light pulses onto said object;
   converting light reflected from said object into an electrical signal;
   detecting a light intensity of said reflected light from said electrical signal;
   adjusting a pulse width of at least one light pulse in response to the detected light intensity; and
   detecting said optical information from said electrical signal.

2. A method according to claim 1 wherein said steps of projecting, converting, detecting, and adjusting occur in a plurality of operational cycles, and wherein the adjusting step of each operational cycle includes the step of adjusting the pulse width of at least one light pulse in response to the light intensity detected during a previous operational cycle.

3. A method according to claim 1 wherein said step of detecting includes the step of averaging said electrical signal.

4. A method according to claim 3 wherein said step of averaging includes the step of integrating said electrical signal.

5. A method according to claim 1 wherein said detecting step includes the step of detecting said light intensity with a plurality of light receiving elements.

6. A method according to claim 1 wherein said step of projecting includes the step of projecting said plurality of light pulses from each of a plurality of light emitting diodes.

7. Apparatus for reading optical information from an object, comprising:
   means for projecting a plurality of light pulses onto said object;
   means for converting light reflected from said object into an electrical signal;
   means for detecting a light intensity of said reflected light from said electrical signal;
   means for adjusting a pulse width of at least one light pulse in response to the detected light intensity; and
   means for detecting said optical information from said electrical signal.

8. Apparatus according to claim 7 wherein said means for projecting, said means for converting, said means for detecting, and said means for adjusting operate in a plurality of operational cycles, and wherein said means for adjusting includes means for adjusting said pulse width of at least one light pulse in response to the detected light intensity from a previous operational cycle.

9. Apparatus for reading optical information from a object, comprising:
   a plurality of light emitting diodes for projecting light on to said object simultaneously, each light emitting diode emitting a plurality of light pulses;
   a plurality of light responsive elements for converting light reflected from said object into a series of electrical signals in each of a plurality of operational cycles;

means for generating a start signal applied to said converting means to begin each operational cycle of said converting means;

means for recognizing said optical information on said object in response to said electrical signals produced in said each operational cycle;

means for detecting, in response to said electrical signals, the intensity of light projected by said light emitting diodes in said each operational cycle; and means for adjusting, in response to the intensity of light detected in a previous operational cycle of said converting means, a time period in which said light emitting diodes are activated, the time period being increased and decreased as the detected intensity of light in the previous operational cycle is respectively decreased and increased.

10. Apparatus according to claim 9, wherein said intensity detecting means includes means for averaging said electrical signals produced in said each operational cycle of said converting means.

11. Apparatus according to claim 9, wherein said intensity detecting means includes means for holding a peak level of said electrical signals produced in said each operation cycle.

12. Apparatus for reading optical information printed in bar code form on an object, comprising:

means for projecting light onto said bar code simultaneously, said means projecting a plurality of light pulses;

means, including a plurality of charge-coupled devices, for converting light reflected from said bar code into a series of electrical signals in each one of a plurality of operational cycles of said converting means;

means for repeatedly generating a start signal applied to said converting means to begin each of said operational cycles;

means for recognizing said bar code in response to said electrical signals;

means for detecting, from output levels of said electrical signals, intensity of light projected by said light projecting means in said each operational cycle; and means for adjusting, in response to the intensity of light detected in a previous operational cycle, a time period in which said light projecting means is activated, the time period being increased and decreased as the detecting intensity of light in the previous operational cycle is decreased and increased, respectively.

13. Apparatus according to claim 12, wherein said means for adjusting adjusts a pulse width of at least one light pulse projected by said means for projecting.

14. Apparatus according to claim 12, wherein said means for detecting includes means for integrating said electrical signal.

* * * * *